Feb. 26, 1935.     S. W. FORD     1,992,200
RANGE BOILER UNION
Filed May 21, 1934
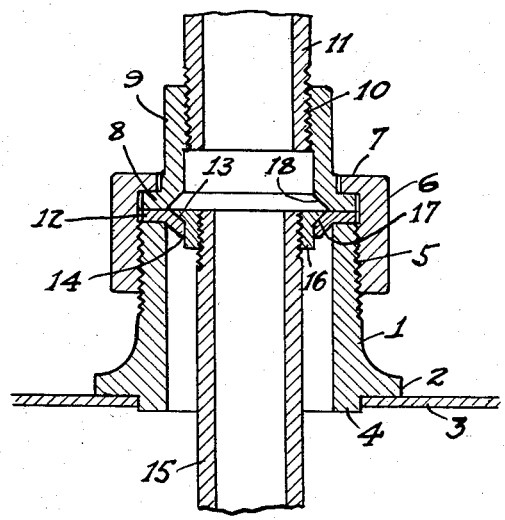
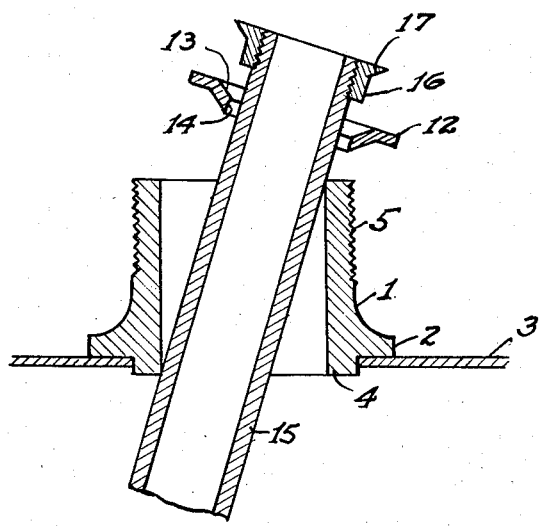
WITNESSES:—
William E. Simpson
D. J. Hyson
INVENTOR:—
Samuel W. Ford Patented Feb. 26, 1935

1,992,200

UNITED STATES PATENT OFFICE 1,992,200

RANGE BOILER UNION

Samuel W. Ford, Detroit, Mich.

Application May 21, 1934, Serial No. 726,630

1 Claim. (Cl. 285—25)

My invention relates to unions for connecting range boilers or hot water tanks to the water supply pipes, and its principal object is to prevent siphoning of the boiler or tank when the stop and waste in the supply pipe is shut off.

Another object of my invention is to provide a union which is simple in construction, economical to manufacture, and which is so designed that the parts may be easily and quickly removed and replaced.

A further object of my said invention is to provide a union of the character referred to which is so constructed as to permit of the insertion and removal of the long inlet extension pipe in cases where the boiler is located near a ceiling or in otherwise restricted quarters.

With these an other objects in view, the invention consists in the improved construction, arrangement, and combination of parts which will be hereinafter fully described, reference being had to the accompanying drawing, which illustrates a preferred embodiment thereof, in which drawing—

Figure 1 is a vertical section through my improved union showing all of the parts in their relative operative positions, and Figure 2 is a similar view with the upper parts removed, illustrating the method of withdrawing the pipe extension.

Like characters designate corresponding parts throughout the two views.

1 is the body of the union having the flange 2 which abuts upon the crown of the boiler 3 and is provided with the concentric projection 4 which fits within the usual opening in the boiler and is secured in position by welding or other means. Upon the upper end of the body is the externally threaded portion 5 adapted to receive the internally threaded nut 6, the said nut having the inwardly extending flange 7 which engages the lower flange 8 of the socket 9. The upper end of the socket 9 has the internally threaded portion 10 into which is screwed the inlet pipe 11 in the manner well known in the art.

Between the upper face of the body 1 and the lower face of the flange 8 upon the socket is a washer 12, of lead or other soft material, the said washer having an outer flat annular portion adapted to be clamped between the said body and the said flange, and an inner concentric portion formed with a frusto-conical seat 13 and an opening 14. 15 is the usual downward extension of the inlet pipe, upon the upper end of which is screwed a flange 16, the said flange having a frusto-conical head 17 which fits against the seat 13 and forms a tight joint in conjunction therewith, the parts being held in position by gravity only so that an excess of pressure within the tank will cause the pipe 15 and the flange 16 to be lifted upwards, thereby releasing the pressure. In order to provide proper clearance to allow of this movement, the inner edge of the socket 9 is chamfered, as indicated at 18.

It should be explained here that the reason for making the washer 12 of soft material lies in the fact that the pipe 15 together with the flange 16 must be subjected to a galvanizing or other coating process in order to prevent corrosion, as a result of which process the frusto-conical surface of the flange becomes roughened and might in ordinary cases require refacing in order to provide a tight joint between it and the seat 13. According to my construction, however, I may use the parts in the rough condition and ensure proper seating by pressing or hammering the flange into position against the soft washer.

When it is desired to withdraw the extension 15 from the boiler for any purpose, the nut 6, socket 9, and pipe 11 are removed in the usual manner, after which the pipe 15 together with the flange 16 and the washer 12 are lifted out as shown in Figure 2, from which it will be seen that it is possible to incline the pipe to a considerable angle from the vertical so that it may clear obstructions in its upward path which might otherwise necessitate cutting of the pipe itself.

It will be observed from the foregoing description and by reference to the drawing that I have provided a union of the character described which adequately fulfills the several objects in view, and while I have herein described and shown a preferred embodiment of my invention, it will be readily understood by those skilled in the art that the same may be modified in various ways to meet any particular or peculiar requirement, without departing from the spirit of my invention. For example, instead of forming the washer 12 entirely of lead or other soft material, I may form the body of the same from sheet steel or other relatively hard metal and coat the same with lead, zinc, or other soft material. Furthermore, instead of making the seat 13 and the co-acting surface of the flange 17 of frusto-conical shape, I may form the same as segments of spheres, so that the pipe 15 may swing to a certain extent out of vertical alignment without breaking the joint.

Having thus described my said invention, what I claim and desire to secure by Letters Patent of the United States is:

A range boiler union comprising a body having a relatively wide mouth and a lower flange for connection to a boiler wall and an upper externally threaded portion, a nut upon said threaded portion having an inwardly extending flange and a central opening, a socket within said opening internally threaded to receive a supply pipe and provided with an outwardly extending flange adapted to co-act with the flange upon the nut and being held in position thereby, a washer of relatively soft material having its outer edge positioned between the flange of said socket and the upper face of said body and having its inner edge projecting into the bore of said body and provided with a conical seat, and a pipe extending downwards into the boiler having at its upper end a flange adapted to fit loosely against the conical seat of the washer and to form in conjunction therewith a closure between the body and the pipe extension, there being an annular space between the exterior of said pipe and the interior of said body whereby said pipe may be tilted at an angle to said body to facilitate its removal.

SAMUEL W. FORD.